(12) United States Patent
Salpietra

(10) Patent No.: US 10,239,011 B2
(45) Date of Patent: Mar. 26, 2019

(54) FILTERS, MOUNTS AND METHODS OF MOUNTING FILTERS

(71) Applicant: Jordan Salpietra, Shreveport, LA (US)

(72) Inventor: Jordan Salpietra, Shreveport, LA (US)

( * ) Notice: Subject to any disclaimer, the term of this patent is extended or adjusted under 35 U.S.C. 154(b) by 165 days.

(21) Appl. No.: 15/351,837

(22) Filed: Nov. 15, 2016

(65) Prior Publication Data

US 2017/0056809 A1 Mar. 2, 2017

Related U.S. Application Data

(63) Continuation of application No. 14/304,765, filed on Jun. 13, 2014, now Pat. No. 9,555,356.

(Continued)

(51) Int. Cl.
*B01D 50/00* (2006.01)
*F24C 15/20* (2006.01)
(Continued)

(52) U.S. Cl.
CPC ........... *B01D 50/002* (2013.01); *B01D 45/08* (2013.01); *B01D 46/0005* (2013.01);
(Continued)

(58) Field of Classification Search
CPC .... B01D 45/08; B01D 46/0005; B01D 46/10; B01D 46/16; B01D 50/002; B01D 2279/35; B01D 45/06; F24C 15/2035
See application file for complete search history.

(56) References Cited

U.S. PATENT DOCUMENTS 2,978,064 A 4/1961 Deaver
3,945,812 A * 3/1976 Doane .................... B01D 45/08
95/272

(Continued)

FOREIGN PATENT DOCUMENTS

CN 101033865 9/2007
DE 29906295 8/1999
(Continued)

OTHER PUBLICATIONS

The First Office Action in Chinese Application No. 201480040184.2 dated Feb. 16, 2017.

(Continued)

*Primary Examiner* — Robert Clemente
(74) *Attorney, Agent, or Firm* — Baker Botts L.L.P.

(57) ABSTRACT

A grease filter for installation within an aperture of an exhaust hood overlying kitchen equipment where heat or flame may occur, the grease filter comprising an external frame assembly, a UL 1046 listed grease filter, and a removable perforated insert. The external frame assembly defines a pathway for airflow therethrough and partially defines a first chamber of the grease filter and a second chamber of the grease filter. The UL 1046 listed grease filter being disposed within the first chamber of the grease filter and being secured within the external frame assembly. The removable perforated insert being disposed within the second chamber of the grease filter and wherein the external frame assembly is configured to allow the removable perforated insert to be removably installed within the second chamber in a spaced relation from the UL 1046 listed grease filter.

20 Claims, 17 Drawing Sheets

Related U.S. Application Data

(60) Provisional application No. 61/835,383, filed on Jun. 14, 2013.

(51) Int. Cl.
   *B23P 19/00* (2006.01)
   *B01D 46/00* (2006.01)
   *B01D 46/10* (2006.01)
   *B01D 46/16* (2006.01)
   *B01D 45/08* (2006.01)
   *B01D 46/42* (2006.01)

(52) U.S. Cl.
   CPC ............ *B01D 46/10* (2013.01); *B01D 46/16* (2013.01); *B01D 46/4227* (2013.01); *B23P 19/00* (2013.01); *F24C 15/2035* (2013.01); *B01D 2265/028* (2013.01); *B01D 2277/20* (2013.01); *B01D 2279/35* (2013.01); *Y10T 29/49826* (2015.01)

(56) References Cited

U.S. PATENT DOCUMENTS

| | | | |
|---|---|---|---|
| 4,350,504 | A | 9/1982 | Diachuk |
| 4,902,316 | A | 2/1990 | Giles, Sr. et al. |
| 5,330,638 | A | 7/1994 | Burklund et al. |
| 5,470,365 | A | 11/1995 | Jang |
| 5,853,445 | A | 12/1998 | Wong et al. |
| 6,203,592 | B1 | 3/2001 | Carawan |
| 6,293,983 | B1 | 9/2001 | More |
| 6,833,022 | B2 | 12/2004 | Feisthammel et al. |
| 7,041,159 | B2 | 5/2006 | Entezarian et al. |
| 7,581,539 | B2 | 9/2009 | Aviles |
| 7,785,382 | B2 | 8/2010 | Morton |
| 8,182,588 | B2 | 5/2012 | Morton |
| 8,277,530 | B2 | 10/2012 | Alexander et al. |
| 2003/0164093 | A1 | 9/2003 | Brownell et al. |
| 2004/0107834 | A1 | 6/2004 | Feisthammel et al. |
| 2004/0139858 | A1 | 7/2004 | Entezarian et al. |
| 2007/0163216 | A1 | 7/2007 | Smasal et al. |
| 2007/0204854 | A1 | 9/2007 | Morton |
| 2007/0245703 | A1 | 10/2007 | Randinelli et al. |
| 2008/0072753 | A1 | 3/2008 | Lukens et al. |
| 2009/0194093 | A1 | 8/2009 | Aviles |
| 2010/0071324 | A1 | 3/2010 | Alexander et al. |
| 2012/0144790 | A1 | 6/2012 | Cambo et al. |
| 2012/0192534 | A1 | 8/2012 | Lambertson |
| 2013/0007998 | A1 | 1/2013 | Alexander et al. |
| 2014/0250844 | A1 | 9/2014 | Lambertson |
| 2017/0354910 | A1 | 12/2017 | Lambertson |

FOREIGN PATENT DOCUMENTS

| | | |
|---|---|---|
| DE | 102006023236 | 11/2007 |
| EP | 1826493 A2 | 8/2007 |
| WO | WO2007/096731 | 8/2007 |

OTHER PUBLICATIONS

European Patent Office, Communication pursuant to Article 94(3) EPC, issued in EP Application No. 14 737 436.7, dated Oct. 18, 2016.

European Patent Office, Examination Report, issued in EP Application No. 14 737 436.7, dated Oct. 18, 2016.

EPO Search Report in European Application No. 17179669.1-1605, dated Dec. 5, 2017, 9 pages.

Further Examination Report from New Zealand Intellectual Property Office in NZ Application No. 715171 dated Jun. 5, 2018, 2 pages.

Notice of Acceptance from New Zealand Intellectual Property Office in NZ Application No. 715171 dated Jun. 19, 2018, 1 page.

Communication pursuant to Rule 164(2)(b) and Article 94(3) EPC, in EP Application No. 14 737 436.7-1605, dated Jun. 20, 2017, 11 pages.

First Examination Report in New Zealand Application No. 715171, dated Nov. 21, 2017, 7 pages.

Australian Examination Report in Australian Application No. 2014277944 dated Oct. 5, 2018, 7 pages.

Japanese Office Action in Japanese Application No. 2016-519692 (with translation), dated Aug. 14, 2018, 19 pages.

Examination Report No. 2 for Standard Patent Application, in Australian Application No. 2014277944, dated Nov. 14, 2018, 3 pages.

\* cited by examiner

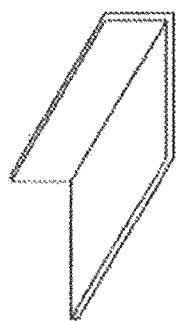
FIG. 10
FIG. 11
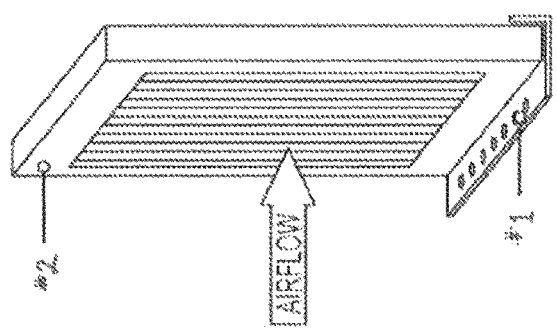
FIG. 13
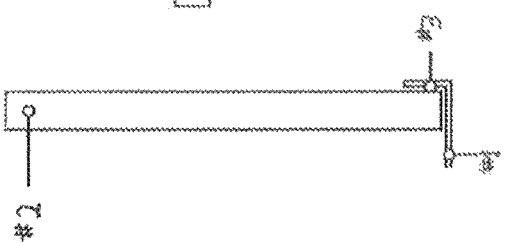
FIG. 12

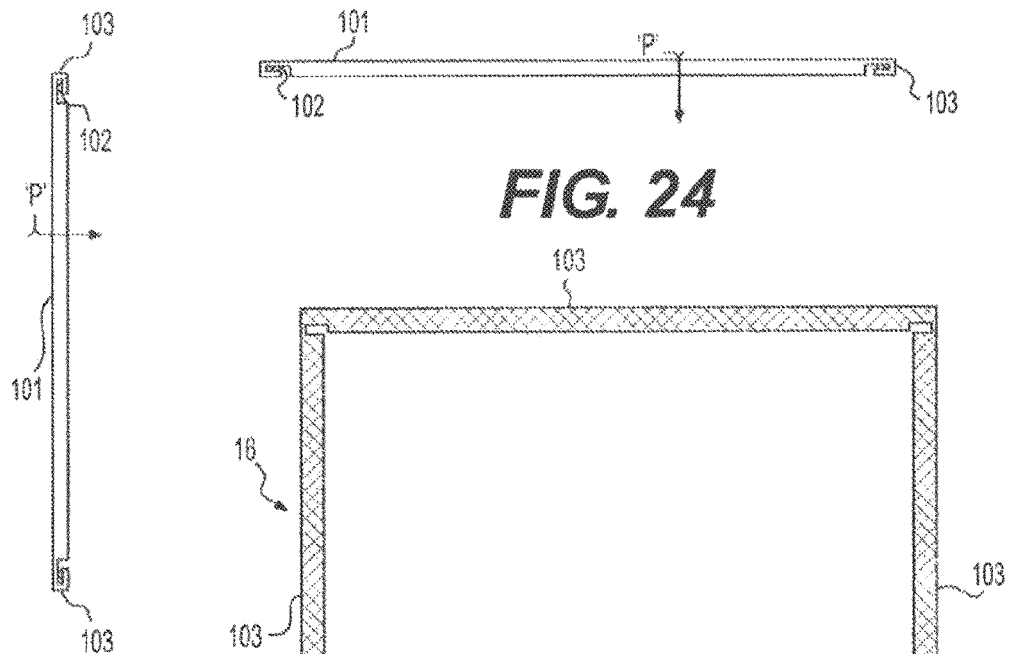
FIG. 23
FIG. 24
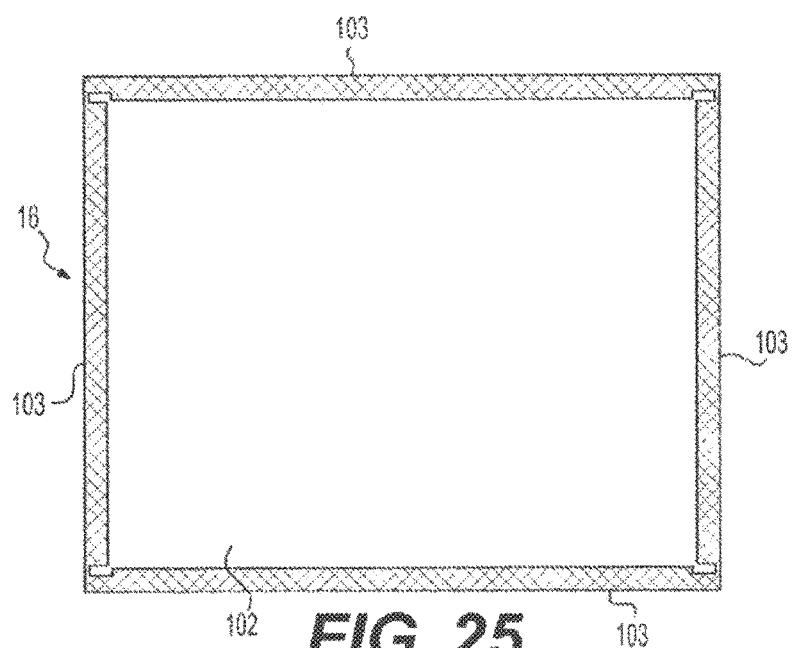
FIG. 25
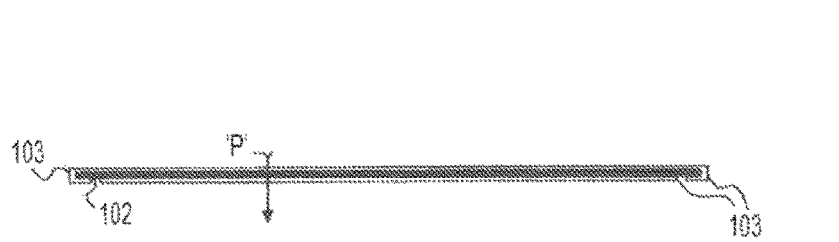
FIG. 26
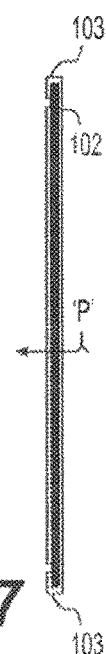
FIG. 27

FILTERS, MOUNTS AND METHODS OF MOUNTING FILTERS

RELATED APPLICATIONS

This application is a continuation under 35 U.S.C. § 120 of U.S. application Ser. No. 14/304,765, filed Jun. 13, 2014 and entitled "Filters, Mounts and Methods of Mounting Filters" and claims the benefit of U.S. Provisional Patent Application No. 61/835,383, entitled "Filters, Mounts and Methods of Mounting Filters," and filed on Jun. 14, 2013, which is hereby incorporated by reference.

BACKGROUND OF THE INVENTION

Field of the Invention

The invention relates generally to filters, mounts or brackets for mounting filters, and methods of mounting filters.

Summary of the Invention

Filters may be employed in canopies or hoods overlying relatively large grills, broilers, ranges, stoves and like equipment in kitchens of restaurants and other facilities where food is prepared. Such filters may be typically provided with a rectangular frame to which rows of baffles are secured in staggered relation to form a grease and/or flame retarding filter for a kitchen exhaust/ventilation system. Nevertheless, there remains a need for a disposable grease filter pad, which is removable and replaceable, and which may be sandwiched inside of a separate UL1046 listed grease filter. The disposable grease filter pad may be in place for extracting grease from grease-laden exhaust air and removed for permitting direct cleaning of all other filter surfaces.

Grease filters and/or grease removal devices may be installed in exhaust hoods above various types of cooking equipment including, for example, deep-fat fryers, grills, griddles, and ovens where excess heat and flame may occur. In applications using existing wool or fiber-based filters, problems may be encountered due to excessive heat or flame. Unless stainless steel heat shields are placed in front of the wool filters, there is the possibility that concentrations of heat (e.g., from exhaust of the cooking equipment) may degrade the wool fibers and cause a hole to form in the filter. Similarly, flames may make holes in the filter if they come in direct contact with the filter which can happen above griddles and grills with a grease flare-up. This is a major draw-back since a hole in the filter renders it ineffective and requires that the filter be replaced.

Existing wool filters often require a separate support frame and an additional frame cover made of metal, which is both costly, labor intensive, heavy for the operator to use, and susceptible to damage, often requiring costly replacement. This assembly, often along with an optional heat shield, causes the current wool-based system to be not only expensive to make but it can be difficult for the user to operate. In addition, there are existing wool filters that include a non-metallic support frame that is embedded inside of a filter n at, but this does not allow for reuse of the support frame, making the replacement filters very expensive for operations.

According to an embodiment of the invention, a filter may have upper and lower baffle assemblies on one side, a removable perforated insert, a disposable grease filter pad, and a single baffle assembly on the other side, to define a tortuous path for exhaust air flowing there through. Further, a kitchen ventilation system may be provided that includes a food preparation apparatus such as a grill, a broiler, a range, or a stove, and a canopy located above the apparatus for exhausting air rising upwardly from the apparatus and laden with grease and/or oil vapors. A grease filter according to embodiments of the invention may be mounted within a mouth of the canopy and may be removable therefrom for cleaning.

According to another embodiment of the invention, a filter assembly may include a reusable external support frame embedded with a filter pad, the reusable support frame being configured ter provide support, to the filter pad to maintain the filter pad in a generally flat configuration and the filter pad comprising fibers configured to absorb grease particulates such as, for example, wool fibers, wood-based viscose fibers, and cellulose-based synthetic fibers. The filter pad may be tucked into the reusable external support frame's backside edges.

In an embodiment of the invention, a filter assembly may include a filter pad comprising fibers including natural, synthetic, and/or hybrid fibers. The filter pad may be tucked into the respective edges of the non-combustible reusable support frame's backside edges. The reusable support frame may be configured to provide support to the filter pad to maintain the filter pad in a generally flat configuration. In accordance with a particular embodiment, the filter pad may be comprised of at least first and second fibrous mats being coupled together. This united filter pad may be tucked into the respective edges of the non-combustible reusable support frame's backside.

Thus, embodiments of the invention provide a filter assembly that has a reusable external support frame that does not consist of multiple pieces. In addition, the filter assembly is effective at removing or reducing grease particulates from grease laden air. Accordingly, baffle filters may remain cleaner for a longer period of time, thereby being an even more effective fire barrier since the fuel source (e.g., grease particulates) has been decreased from the airflow prior to reaching any baffle filters and/or ductwork. In addition, the filter assembly may distribute flame more evenly across a baffle filter, when the filter assembly is located upstream from a baffle filter. Accordingly, baffle filters may be protected from fire and damage, perform better, and remain cleaner for a longer period of time.

According to other embodiments of the invention, a clip-on bracket may create an internal vertical support for metal and fiber-based grease filters in commercial kitchen exhaust hoods, or the like. The bracket may be made of metal and may include perforated holes spaced throughout the trough of the bracket for draining of fats, oils, grease, or the like that may collect in the trough. The profile of the bracket may include a u-shaped edge, which may function as a type of hanger or clip. The u-shaped edge may straddle the bottom lip of the exhaust hood's aperture opening, and may be oriented so that the trough of the bracket is protruding do stream to the airflow. This configuration allows all types of grease filters to rest inside the aperture opening, without requiring any welding or structural modifications. The clip-on bracket may be easily removed for cleaning and/or maintenance, and mounted in place using a simple clip-on installation procedure.

In an embodiment of the invention, a removable clip-on bracket may create a support channel for grease filters, or the like, on the inside of an aperture opening of a commercial kitchen exhaust hood, or the like.

In another embodiment of the invention, a process of mounting a filter comprises inserting a disposable grease filter inside the aperture opening of a commercial kitchen exhaust hood such that the installation process does not require welding or any other type of structural modification in the existing exhaust hood canopy. A process of mounting a filter comprises inserting a disposable grease filter in the same filter channel as a metal, baffle-type grease filter.

In still another embodiment of the invention, a process of mounting a filter comprises placing a disposable grease pre filter in front of a metal baffle-type grease filter and inside the aperture opening of a commercial kitchen exhaust hood. In such a configuration, no additional external or internal brackets are required to hold the disposable grease pre-filter in place.

In yet another embodiment of the invention, a metal L-bracket may be mounted to the bottom of a baffle-type grease filter for use in commercial kitchen exhaust hoods. The L-bracket may be held in place via weld, screw, glue, or the like. This configuration creates a space in front of the baffle-type grease filter due to the front face of the baffle-type grease filter being held further back. Thus, a pre-filter may rest in front, or upstream, of the metal baffle-type grease filter with both filters in the same support channel. The L-bracket may comprise perforated holes as drain holes for draining fats, oils, grease, or the like.

Other objects, features, and advantages of the present invention are apparent to persons of ordinary skill in the art in view of the following detailed description of the invention and the accompanying drawings.

BRIEF DESCRIPTION OF THE DRAWINGS

For a more complete understanding of the embodiments of the present invention, needs satisfied thereby, and the objects, features, and advantages thereof, reference now is made to the following description taken in connection with the accompanying drawings.

FIG. 10 is a front side view of an L-bracket, including exemplary dimensions, according to an embodiment of the invention.

FIG. 11 is a right side view of the L-bracket, including exemplary dimensions, according to an embodiment of the invention.

FIG. 12 is a right side view of the assembly between the L-bracket and metal baffle-type grease filter, #1 corresponds to the L-bracket, #2 corresponds to the metal baffle-type grease filter, and #3 corresponds to the area of connection between #1 and #2, according to an embodiment of the invention.

FIG. 13 is a right isometric view of the completed L-bracket and filter assembly, according to an embodiment of the invention.

FIG. 23 is a right elevation view of the right side of the filter assembly, excluding exemplary dimensions, according to an embodiment of the invention.

FIG. 24 is a bottom elevation view of the bottom side of the filter assembly, excluding exemplary dimensions, according to an embodiment of the invention.

FIG. 25 is a back elevation view of the back side of the filter assembly, excluding exemplary dimensions, according to an embodiment of the invention.

FIG. 26 is a cross-sectional view of the grease filter along line 108-108 of FIG. 20.

FIG. 27 is a cross-sectional view of the grease filter along line 107-107 of FIG. 20.

DETAILED DESCRIPTION OF EMBODIMENTS OF THE INVENTION

Embodiments of the present invention, and their features and advantages, may be understood by referring to FIGS. 1-41, like numerals being used for corresponding parts in the various drawings.

Figure 1:
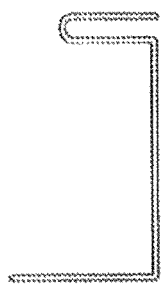
FIG. 1 is an elevation view of the right side of the bracket, including exemplary dimensions, according to an embodiment of the invention.

In an embodiment of the present invention, a clip-on bracket may fit inside of an exhaust hood's aperture opening, allowing the clip-on bracket to support any type of grease filter in place. The clip-on bracket may comprise three bends, one of which is bent and configured to clip-on to a vertical or angled upright portion. The clip-on bracket may be designed to support grease filters in commercial kitchen exhaust hoods, and may comprise a continuous and rigid sheet of metal that includes three bends in the metal. FIG. 1 depicts an elevation view of the right side of the bracket, including exemplary dimensions, according to an embodiment of the invention. The left portion of the bracket in FIG. 1 comprises two bends in the metal, giving production to the clip-on section of the bracket. The far right edge of the bracket in FIG. 1 may serve as a horizontal restraint for any grease filter that rests in the trough of the bracket.

An embodiment of the present invention may be configured to support grease filters on the inside of the aperture opening of commercial kitchen exhaust hoods. Once the bracket according to an embodiment of the present invention is in position, it may support any size baffle filter, with the option of also inserting a disposable grease filter upstream of the baffle filter within the same clip-on bracket. The bracket may comprise three bends, one of which is bent and configured to clip-on to a vertical or angled upright portion.

The clip-on bracket may create an internal vertical support for metal and fiber-based grease filters in commercial kitchen exhaust hoods, or the like. The bracket may comprise metal and may include (perforated holes, which may be spaced throughout the trough of the bracket for draining of fats, oils, grease, or the like that may collect in the trough. The profile of the bracket may include a u-shaped edge, which may function as a type of hanger or clip. The u-shaped edge may straddle the bottom lip of the exhaust hood's aperture opening, and may be oriented so that the trough of the bracket is protruding downstream to the airflow. This configuration may allow for all types of grease filters to rest inside the aperture opening, without requiring any welding or structural modifications. The clip-on bracket may be easily removed for cleaning and/or maintenance, and may be mounted in place using a simple installation procedure. Thus, the removable clip-on bracket may create a support channel for grease filters, or the like, on the inside of an aperture opening of a commercial kitchen exhaust hood, or the like.

A process of mounting a filter may comprise inserting a disposable grease filter inside the aperture opening of a commercial kitchen exhaust hood, such that the installation process does not require welding, or the like, or any other type of structural modification in the existing exhaust hood canopy. A process of mounting a filter may comprise inserting a disposable grease filter in the same filter channel as a metal, baffle-type grease filter.

A process of mounting a filter may comprise placing a disposable grease pre-filter in front of a metal, baffle-type grease filter inside the aperture op g of a commercial kitchen exhaust hood. In such a configuration, no additional external or internal brackets may be required to hold the disposable grease pre-filter in place.

A process of mounting a filter may comprise mounting a metal L-bracket to the bottom of a baffle-type grease filter for use in commercial kitchen exhaust hoods. The L-bracket may be held in place via weld, screw, glue, or the like. This configuration creates a space in front of the baffle-type grease filter due to the front face of the baffle-type grease filter being held further back. Thus, a pre-filter may rest in front, or upstream, of the metal baffle-type grease filter with both filters in the same support channel. The L-bracket may comprise perforated holes as drain holes for draining fats, oils, grease, or the like.

A process of mounting a filter may comprise placing a disposable grease pre-filter in front of a metal baffle-type grease filter inside the aperture opening of a commercial kitchen exhaust hood. No additional external or internal brackets may be required to hold the disposable grease pre-filter in place.

Figure 2:
FIG. 2 is an elevation view of the left side of the bracket, including exemplary dimensions, according to an embodiment of the invention.

FIG. 2 depicts an elevation view of the left side of the bracket, including exemplary dimensions, according to an embodiment of the invention. The right portion of the bracket in FIG. 2 comprises two bends in the metal, forming the clip-on section of the bracket. The far left edge of the bracket in FIG. 2 may serve as a horizontal restraint for any grease filter that rests in the support portion of the bracket that is disposed between the clip and the restraint.

Figure 3:
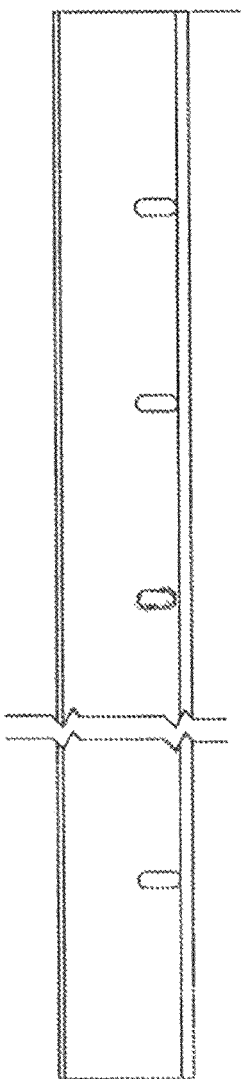
FIG. 3 is a top view of the bracket, including exemplary dimensions, according to an embodiment of the invention.
Figure 4:
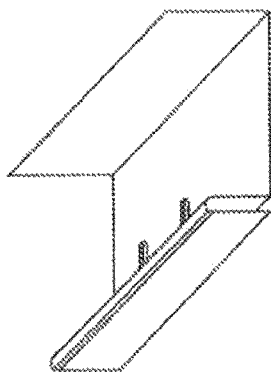
FIG. 4 is an isometric view from the right side of the bracket, according to an embodiment of the invention.

FIG. 3 depicts a top view of the bracket, including exemplary dimensions, according to an embodiment of the invention. As depicted in FIG. 3, a hole may be formed in the bracket. Further, a plurality of holes may be formed in the bracket and may be spaced apart by a predetermined distance along the longitudinal direction of the bracket. The plurality of holes may be equally spaced apart or may have varied spacing. FIG. 4 depicts an isometric view from the right side of the bracket, according to an embodiment of the invention.

Figure 5:
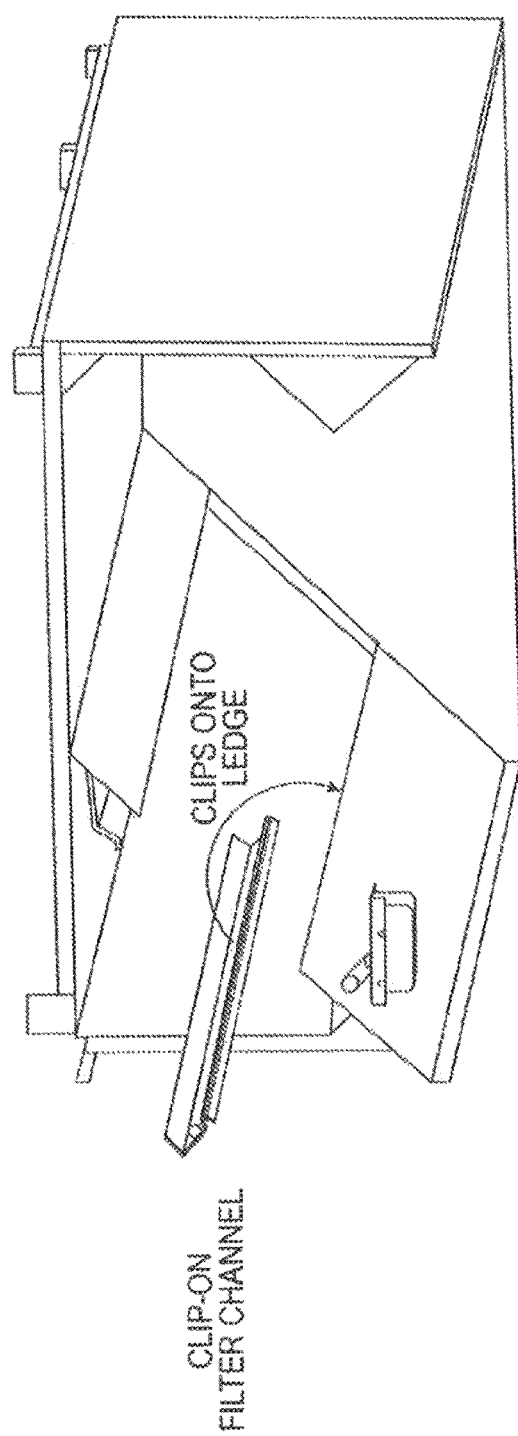
FIG. 5 is a perspective view depicting where the bracket is clipped into the commercial kitchen exhaust hood, according to an embodiment of the invention.

FIG. 5 is a perspective depicting where the bracket is clipped into a commercial kitchen exhaust hood, according to an embodiment of the invention. The bracket may attach to a ledge portion of the exhaust hood. Alternatively, the bracket may attach to a protruding portion in the exhaust hood.

Figure 6:
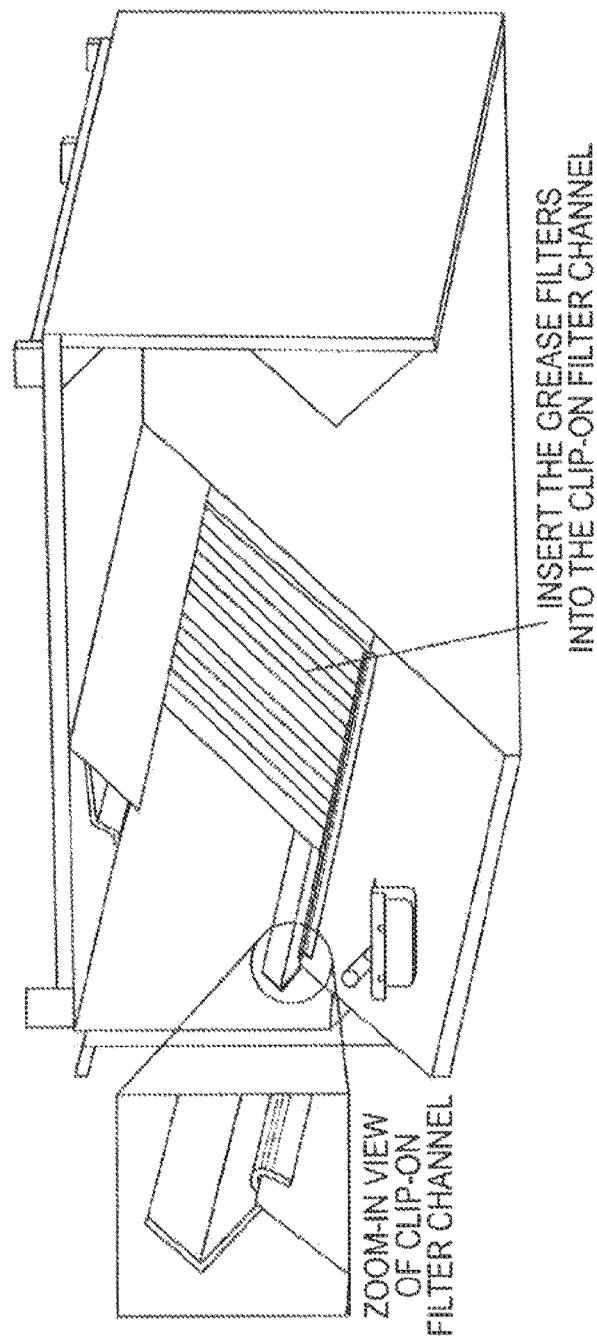
FIG. 6 is a perspective view depicting the bracket in its final resting position after being clipped or hung onto the bottom lip of the aperture opening, according to an embodiment of the invention.

FIG. 6 is a perspective depicting the bracket in its final resting position after being clipped or hung onto the bottom lip of the aperture opening, according to an embodiment of the invention. Filters may be inserted into the bracket, such that a channel portion of the bracket supports the filters.

Figure 7:
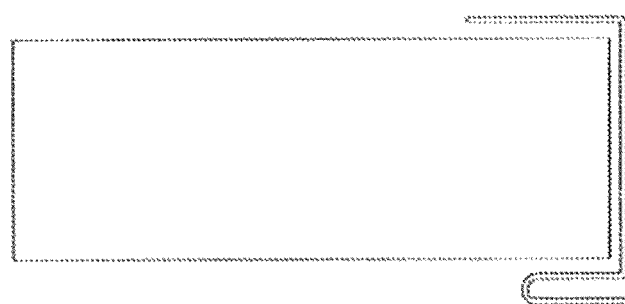
FIG. 7 is an elevation view of the right side of the bracket, depicting how the clip-on bracket may support a metal baffle filter that is, for example, a nominal two inches in thickness, according to an embodiment of the invention.

FIG. 7 is an elevation view of the right side of the bracket, depicting how the bracket may support a metal baffle filter that is, for example, a nominal two inches in thickness, according to an embodiment of the invention.

Figure 8:
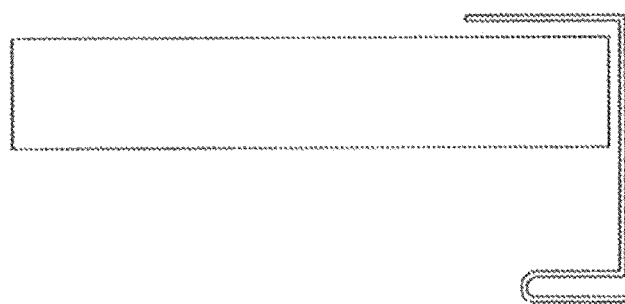
FIG. 8 is an elevation view of the right side of the bracket, depicting how the clip-on bracket may support a metal baffle filter that is, for example, less than a nominal two inches in thickness, according to an embodiment of the invention.

FIG. 8 is an elevation view of the right side of the bracket, depicting how the clip-on bracket may support a metal baffle filter that is, for example, less than a nominal two inches in thickness, according to an embodiment of the invention.

Figure 9:
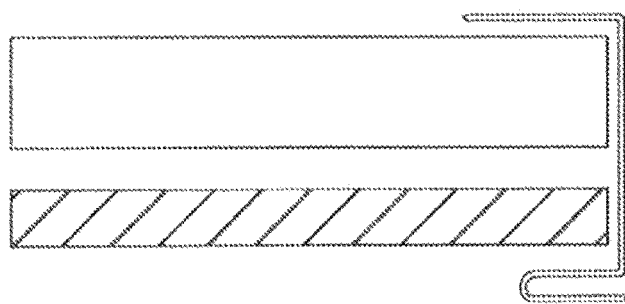
FIG. 9 is an elevation view of the right side of the bracket, depicting how the clip-on bracket may support a metal baffle filter that is, for example, between 0.75 inches and 1.5 inches along with a disposable grease filter on the upstream airflow side of the metal baffle filter, according to an embodiment of the invention.

FIG. 9 is an elevation view of the right side of the bracket, depicting how the clip-on bracket may support a metal baffle filter that is, for example, between 0.75 inches and 1.5 inches along with a disposable grease filter on the upstream airflow side of the metal baffle flute according to an embodiment of the invention. The disposable grease filter, or pre-filter, may be inserted adjacent to the baffle-type filter, such that the bracket supports the pre-filter and the baffle-type filter.

FIG. 10 depicts a front side view of an L-bracket, including exemplary dimensions, according to an embodiment of the invention.

FIG. 11 depicts a right side view of the L-bracket, including exemplary dimensions, according to an embodiment of the invention. The right edge of the bracket in FIG. 11 may comprise a restraint portion. The lower edge of the bracket in FIG. 11 may comprise a support portion.

FIG. 12 depicts a right side vies of the assembly between the L-bracket and metal baffle-type grease filter. #1 corresponds to the L-bracket, #2 corresponds to the metal baffle-type grease filter, and #3 corresponds to the area of connection between #1 and #2, according to an embodiment of the invention.

FIG. 13 depicts a right isometric vies of the completed L-bracket and filter assembly, according to an embodiment of the invention. #1 corresponds to the L-bracket, #2 corresponds to the metal baffle-type grease filter supported by the L-bracket. The direction of airflow is indicated by the arrow labeled "airflow."

Figure 14:
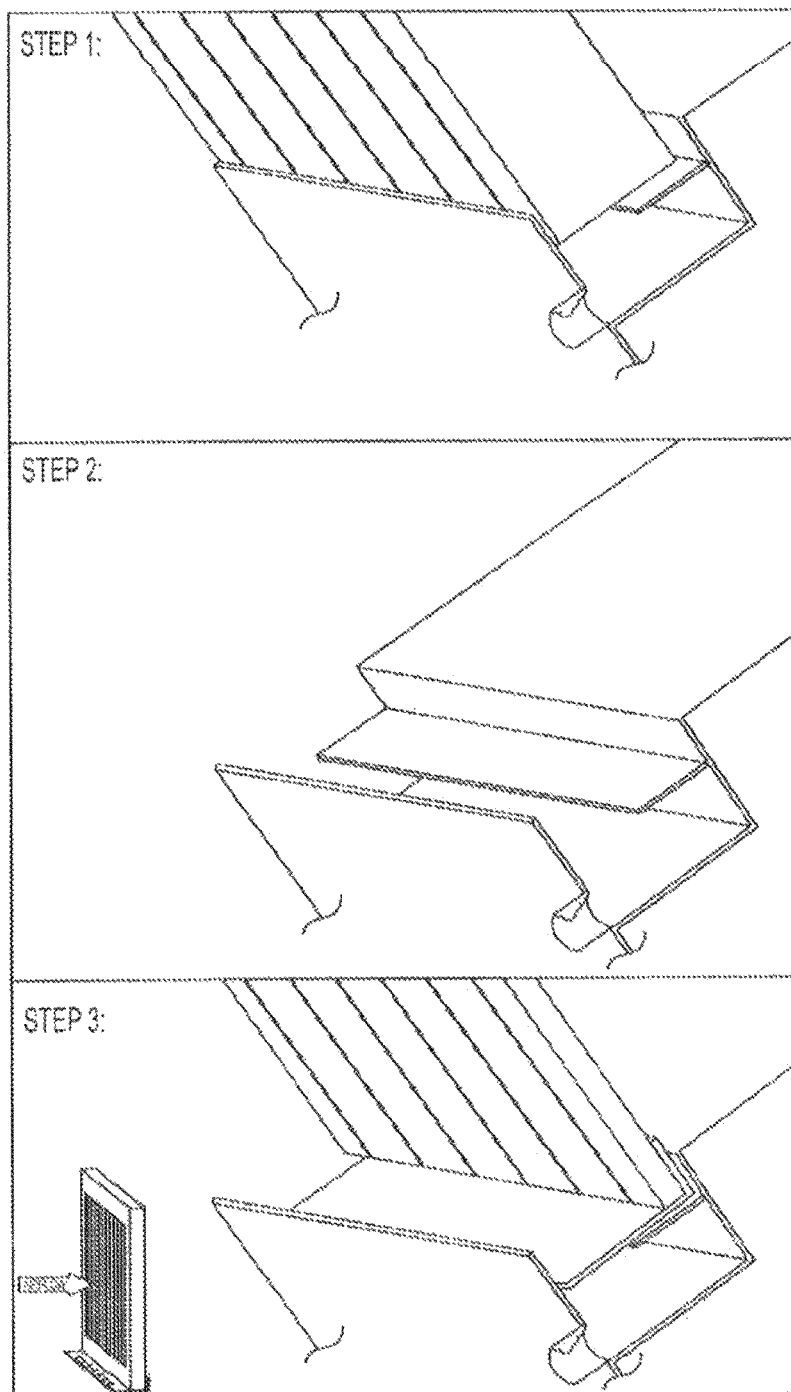
FIG. 14 is a perspective view depicting the L-bracket and baffle filter combination in its final resting position inside the aperture opening of a commercial kitchen exhaust hood, according to an embodiment of the invention.

FIG. 14 is a perspective view depicting the L-bracket and baffle fitter combination in its final resting position inside the aperture opening of a commercial kitchen exhaust hood and the process of mounting, according to an embodiment of the invention. Step 1 depicts the original baffle channel of the exhaust hood with a baffle filter that extends beyond the ledge of the exhaust hood, creating an unsupported portion of the filter. Step 2 depicts the exhaust hood comprising the ledge, without a filter installed therein. Step 3 depicts the L-bracket, according to an embodiment of the invention, with a filter mounted thereon, and the L-bracket/filter combination being inserted into the exhaust hood.

Figure 15:
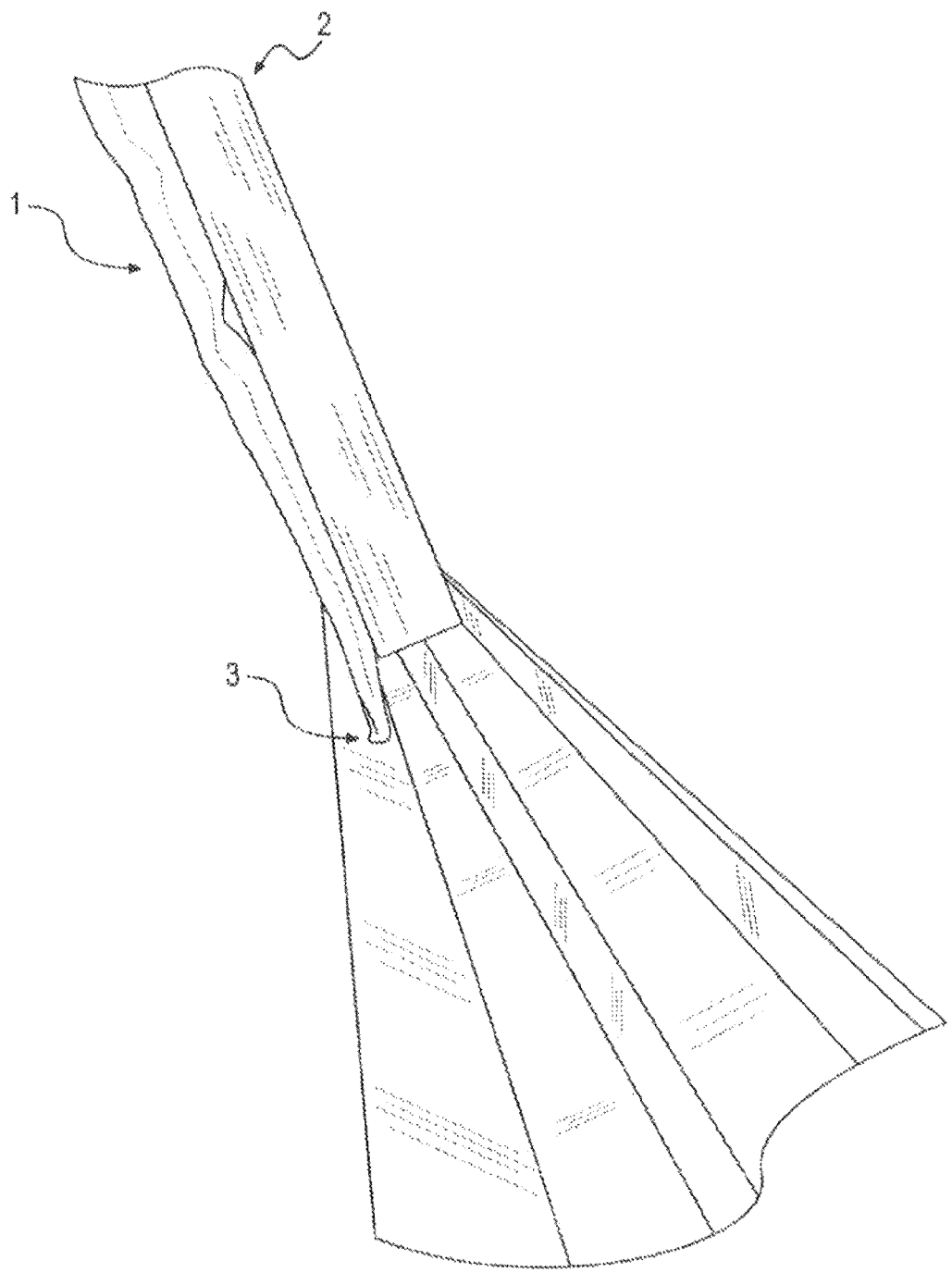
FIG. 15 is a right side view of the disposable grease pre-filter (#1) in it's final resting position in front of the metal baffle-type grease filter (#2) and inside the aperture opening (#3) of a commercial kitchen exhaust hood, according to an embodiment of the invention.

FIG. 15 depicts a right side view of the disposable grease pre-filter (#1) in it's final resting position in front of the metal baffle-type grease filter (#2) and inside the aperture opening (#3) of a commercial kitchen exhaust hood, according to an embodiment of the invention.

Figure 16:
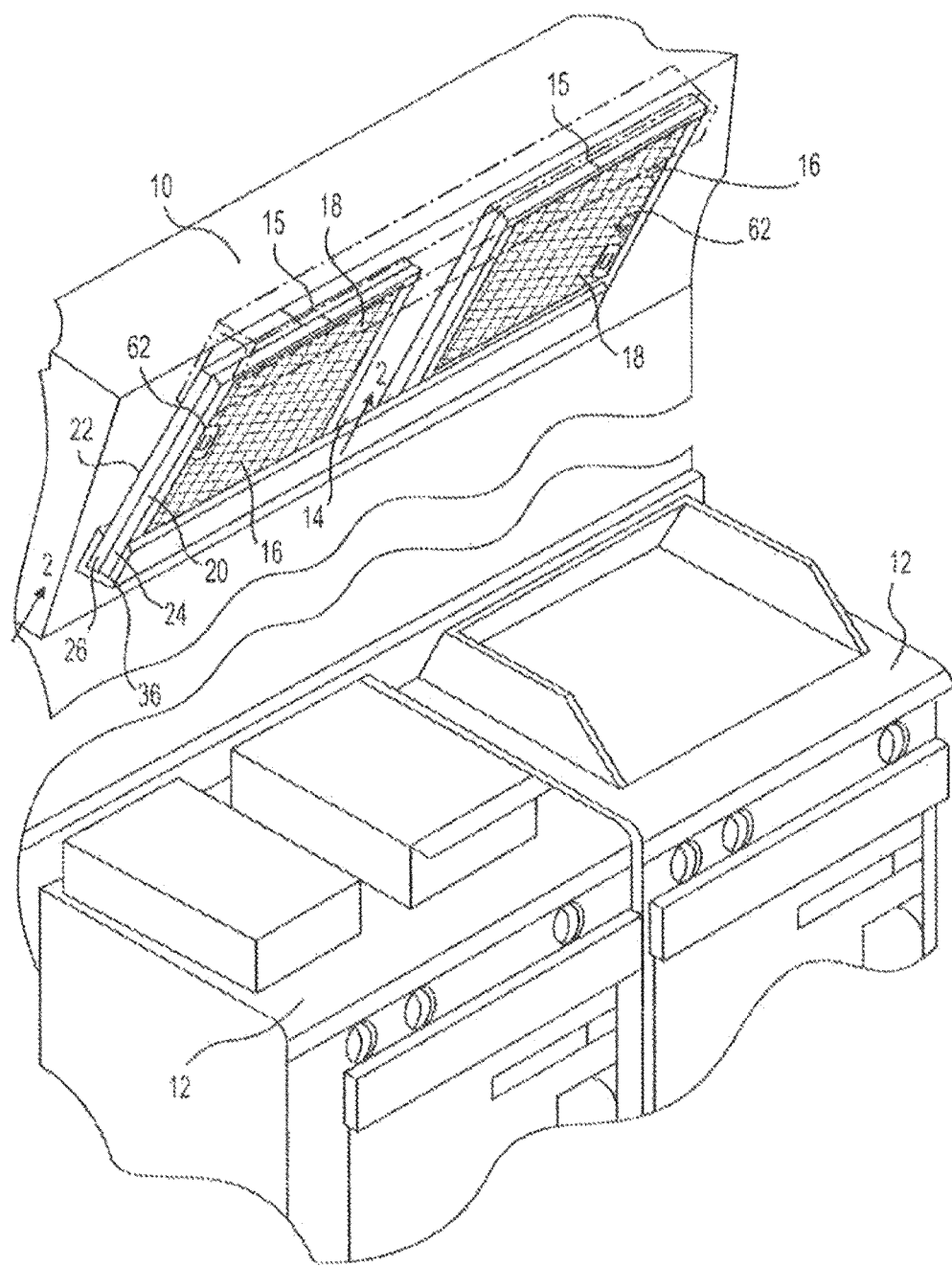
FIG. 16 is a perspective view of a grill and exhaust system utilizing a grease filter, according to an embodiment of the invention.

In addition, a system for exhausting grease and/or oil laden hot air from a kitchen or like area may be provided. An example of such a system is depicted in FIG. 16 in which a canopy 10 extends above food preparation apparatus 12 for receiving grease laden air rising therefrom. The apparatus 12 may include, for example, a grill, a stove, a broiler, a range, or the like, and the canopy 10 may have a mouth 14 providing an exhaust path for air to exit the area. Fans (not shown) or the like may be located upstream of the mouth 14 in the ventilation system to pull air through the mouth 14.

One or more grease filters 16a may be disposed in the mouth 14 of the canopy 10. Each grease filter 16a may provide a tortuous path "P" for air laden with grease, oil and like contaminants so that the contaminants adhere to the surfaces of the grease filter 16a and are thereby removed from the air. The grease filters 16a may be disposed on a slant within the mouth 14 of the canopy 10 so that when grease or like substance accumulates within any of the plurality of gutter-shaped elongate baffles 18 of the grease filter 16a, the grease may slide down the baffles 18 and may be directed to a holding reservoir (not shown). Any remaining airborne grease may pass through the disposable filter pad 15 for future removal.

Periodically, the grease filters 16a may require cleaning Thus, according to embodiments of the invention, the grease filters 16a may be removable from the canopy 10 and may be able to be cleaned in an efficient manner before being re-installed in the canopy 10.

Figure 17:
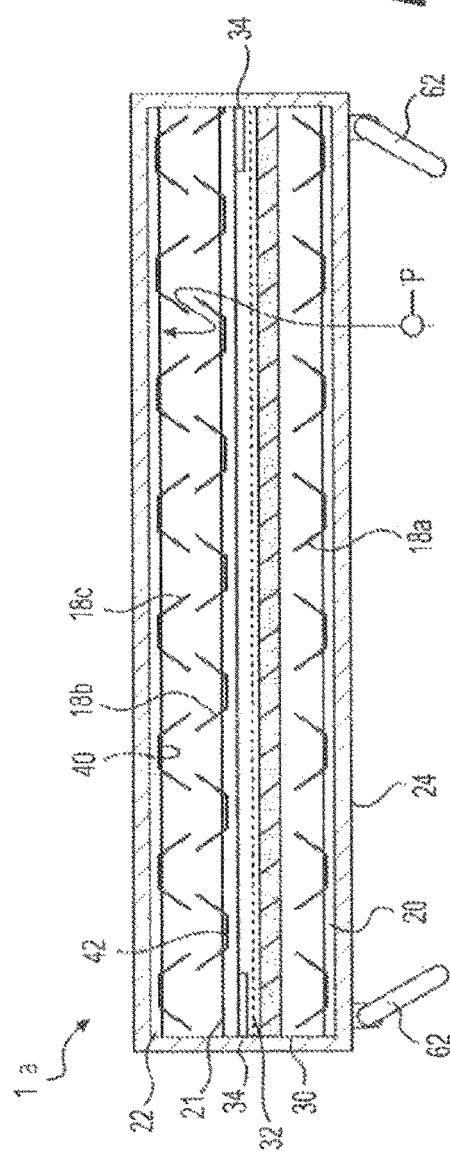
FIG. 17 is a cross-sectional view of the grease filter along line 2-2 of FIG. 16.

As depicted in FIG. 17, the grease filter 16a may include a front baffle assembly 20, a middle baffle assembly 21, an upper baffle assembly 22, a disposable filter pad 30, a removable perforated insert 32, and a middle divider tab 34a. The assembly may include an enclosed frame 24, which may support an array of baffles 18 in a central opening thereof. In FIG. 17, the grease filter 16a may define tortuous paths "P" that may enter the filter 16a via spacing provided between the array of baffles 18a of the front baffle assembly 20, then through the disposable filter pad 30, then through removable perforated insert 32, then through the spacing provided between the array of baffles 18b that are deflected downwardly into the baffles 18b by baffles 18c of the upper baffle assembly 22, and that are then directed upwardly between the baffles 18c and out of the filter 16a. To create these paths, the baffles in each assembly may be laterally spaced-apart providing openings therebetween, and the baffles in the opposed assemblies may be staggered relative to one another to eliminate any paths for grease laden air to pass directly through the grease filter 16a without impinging upon at least one baffle.

The majority of the grease may be filtered from the airflow by the disposable filter pad 15. Any remaining grease carried in passing air may adhere to surfaces 40 of baffles 18c and drip onto surfaces 42 of baffles 18b, or adhere directly to surfaces 42. Thereafter, baffles 18b may function as a channel, or gutter, and direct the accumulation of grease under the force of gravity to an end wall 32 of the grease filter 16a. The end wall 32 may have a series of drainage apertures 34a through which the grease may travel on its way to a holding reservoir (not shown).

The grease filter 16a may be made of, for example, stainless steel, galvanized steel, aluminum, or a like material. The grease filter 16a may be rectangular with dimensions of, for example, about one to three feet by about one to three feet by about several inches. Of course, the grease filter may be made to any dimensions, as desired. A pair of handles 62 may be pivotally connected to the peripheral frame 24 of the lower baffle assembly 20 enabling ready handling of the grease filters 16a during installation and removal relative to the canopy 10. Each baffle may have an elongated base wall 54 with opposite sidewalls 56 and 58 extending transversely therefrom to define a channel, or gutter, which may extend from end wall 46 to end wall 32 of the grease filter 16a.

According to another embodiment of the invention a method of efficiently and effectively cleaning a grease filter 16a of a kitchen ventilating system is provided. The grease filter 16a may be removed from the mouth 14 of the canopy 10 which is located above food preparation apparatus 12. The grease filter 16a may have upper and lower baffle assemblies 20 and 22 which, in a closed position, define tortuous paths "P" for exhausting air therethrough. The grease filter 16a also may have a disposable filter pad 15 in the middle of the grease filter 16a, with the perforated insert 32 resting on the back side of the disposable filter pad 15.

Figure 18:
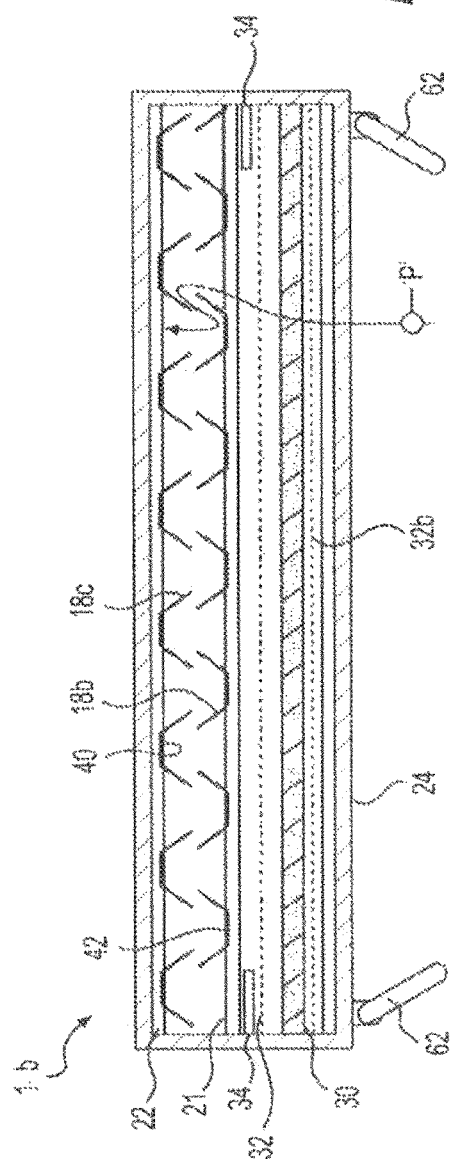
FIG. 18 is an alternative cross-sectional view of the grease filter along line 2-2 of FIG. 16.

After the removable assembly, 15 and 32, has been taken out, the grease filter 16a may be manually cleaned, for example, with soap and a brush or may be cleaned in an automatic dishwasher or pot sink. After the grease filter 16a is cleaned, the removable assembly, 15 and 32, may be reinserted in the grease filter 16a so that the grease filter 16a may be reinserted into the mouth 14 of the canopy 10. Alternatively, as depicted in FIG. 18, the grease filter 16b may be modified by replacing the front baffle assembly 20 (from FIG. 17) with another removable perforated insert 32b.

Figure 19:
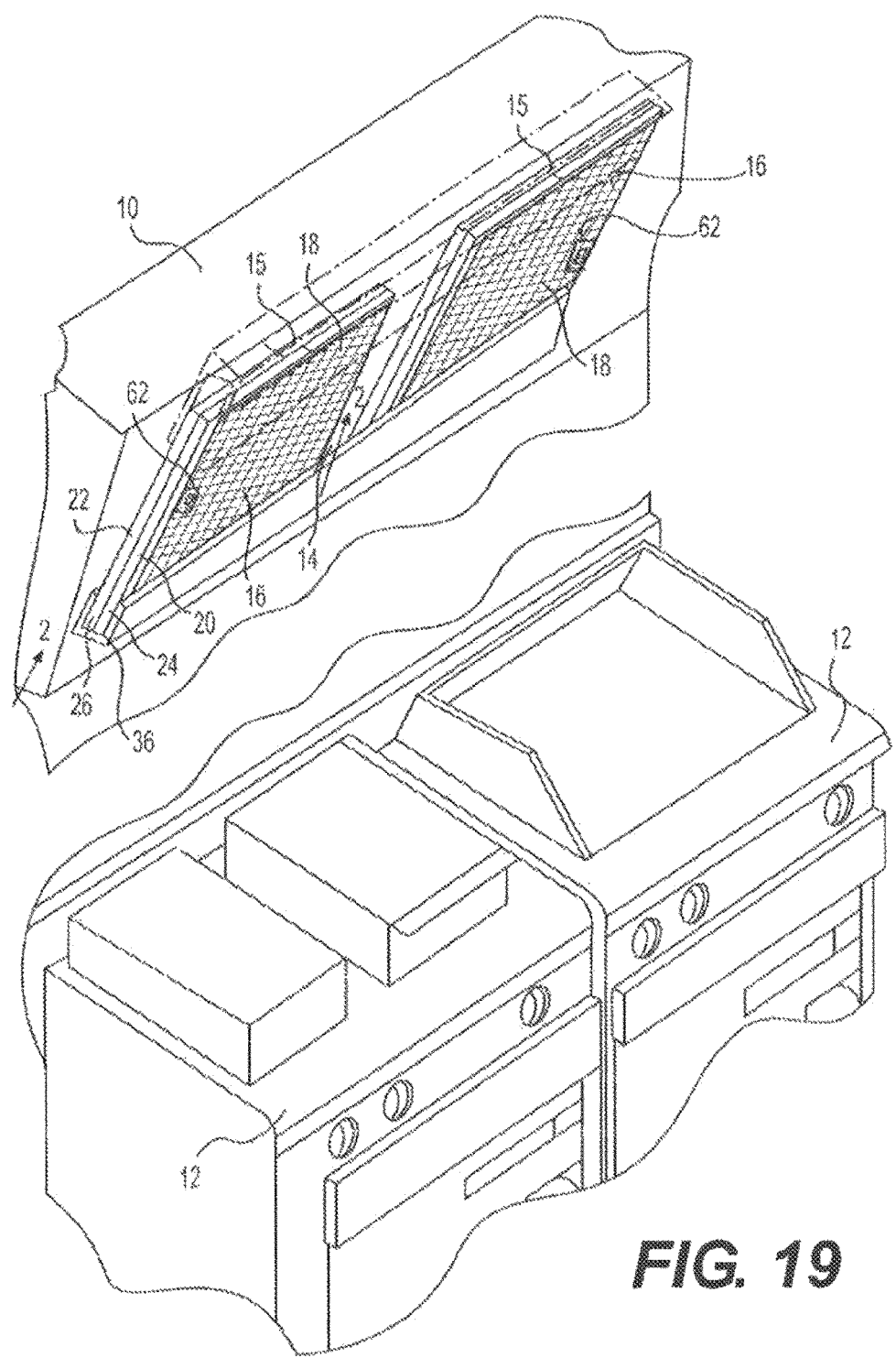
FIG. 19 is a perspective view of a grill and exhaust system utilizing the grease filter, according to an embodiment of the invention.
Figure 21:
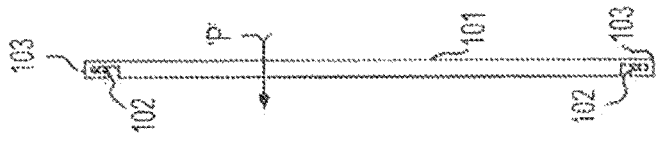
FIG. 21 is a left elevation view of the left side of the filter assembly, excluding exemplary dimensions, according to an embodiment of the invention.

An embodiment of the invention relates to a system for exhausting grease and/or oil laden hot air from a kitchen or like area. An example of such a system is depicted in FIG. 19 in which a canopy 10 extends above food preparation apparatus 12 for receiving grease laden air rising therefrom. The apparatus 12 may include, for example, a grill, a stove, a broiler, a range or the like, and the canopy 10 may have a mouth 14 providing an exhaust path for air to exit the area. Fans (not shown) or the like may be located upstream of the mouth 14 in the ventilation system to pull air through the mouth 14.

To assemble the grease filter 16, as depicted in FIGS. 20-27, the reusable external support frame 101 may be flipped over to reveal the folded back edges 103 of the reusable external support frame 101. The edges of the filter pad 102 may be pushed underneath the exposed reusable external support frame's 101 folded back edges 103. With the assembly of the grease filter 16 completed, the reusable external support frame 101 may provide support to the filter pad 102 to maintain the filter pad 102 in a generally flat configuration, while keeping the filter pad 102 from being seen from the kitchen floor.

Figure 20:
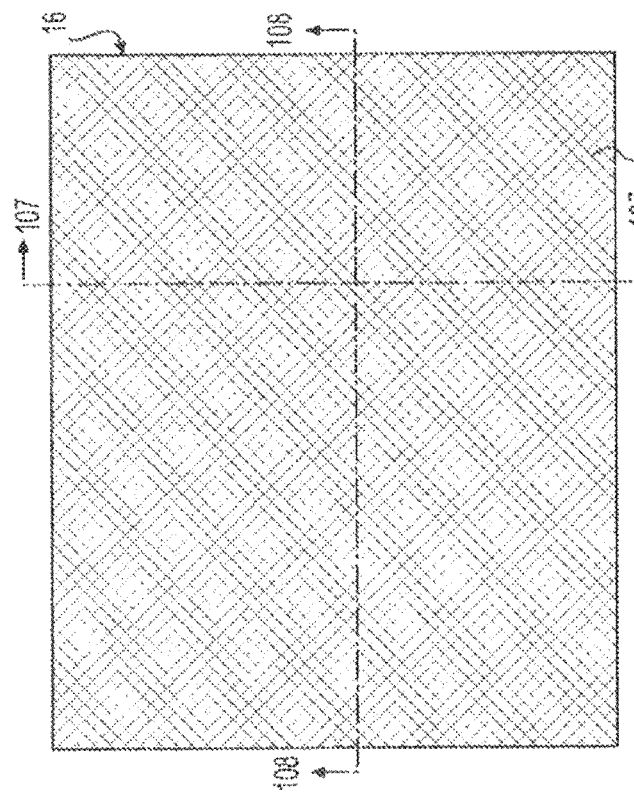
FIG. 20 is a front elevation view of the front side of the filter assembly, excluding exemplary dimensions, according to an embodiment of the invention.
Figure 22:
FIG. 22 is a top elevation view of the top side of the filter assembly, excluding exemplary dimensions, according to an embodiment of the invention.

One or more grease filters 16 may be disposed outside or inside the mouth 14 of the canopy 10. Each grease filter 16 may provide a tortuous path "P" for air laden with grease, oil and like contaminants so that the contaminants adhere to the surfaces of the grease filter 16 and are thereby removed from the air. Any remaining grease may be exposed to: (i) a UL 1046 listed grease filter 22 (as depicted in FIG. 20) that may be positioned behind the grease filter 16; and/or (ii) ductwork associated with vent hood (not shown) that is configured to remove the air from the cooking area (with or without an associated exhaust fan(s)).

Periodically, the reusable external support frame 101 may require cleaning, while the filter pad 102 may sometimes need to be replaced. Thus, according to embodiments of the invention, the grease filters 16 may be removable from the canopy 10 and may be able to be cleaned/replaced in an efficient manner before being re-installed in the canopy 10.

The reusable external support frame 101 can be made of, for example, stainless steel, galvanized steel, aluminum, or a like material. The reusable external support frame 101 may be square or rectangular with dimensions of, for example, about one to three feet by about one to three feet by about several inches. Of course, the grease filter may be made to any dimensions, as desired. A pair of handles 62 may be pivotally connected to the peripheral frame 24 of the lower baffle assembly 20 enabling ready handling of the grease filters 16 during installation and removal relative to the canopy 10.

Figure 28:
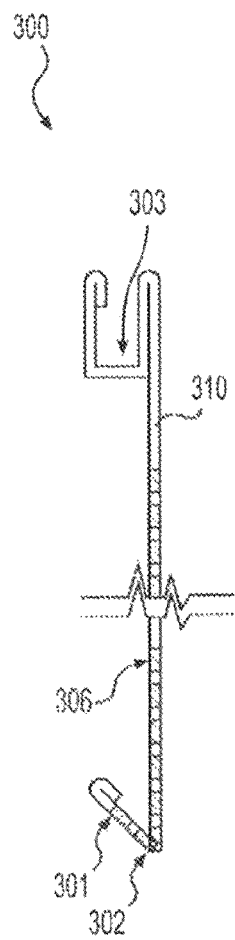
FIG. 28 is a side view of a support frame, according to an embodiment of the invention.

FIG. 28 depicts a side view of a support frame 300, according to an embodiment of the invention. Support frame 300 may include a top bracket portion 303, which may be configured to straddle a ledge of an exhaust hood and secure support frame 300 to restrict or prevent horizontal movement. Support frame 300 may include a bottom edge 301 which may have a folded or bent end portion to provide a pivot point for a filter and wire frame, described in more detail below. Alternatively, bottom edge 301 may include a rigid hinged connection for coupling with the wire frame and filter. Support frame 300 may include a back portion 310 with open sides and perforated holes 306 formed therein. At or near where back portion 310 meets bottom edge 301, drain holes 302 may be formed in support frame 300 to allow captured grease to be drained and collected.

Figure 29:
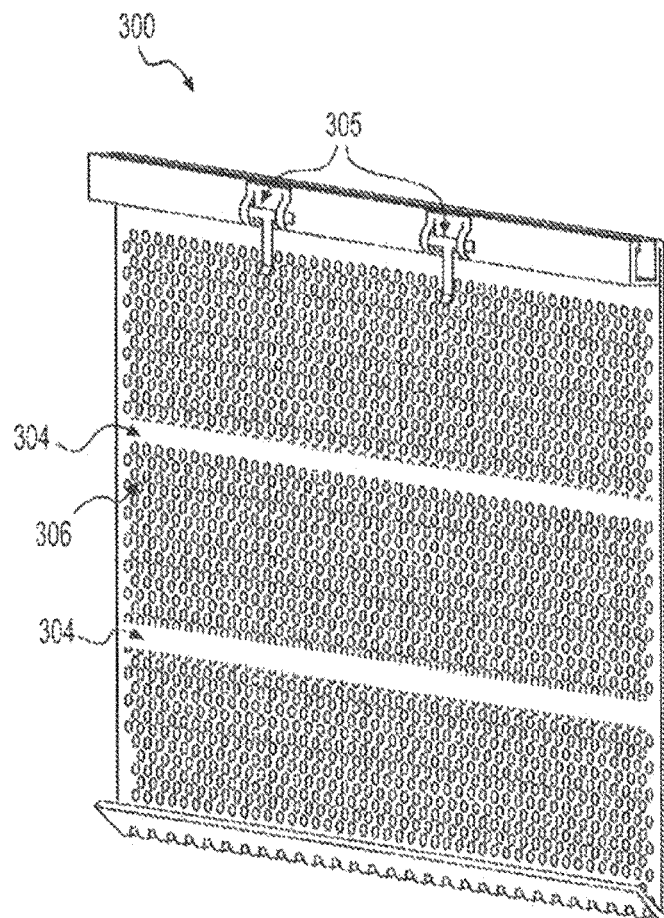
FIG. 29 is a perspective view of the support frame, according to an embodiment of the invention.

Referring to FIG. 29, which depicts a perspective view of support frame 300, perforated holes 306 formed in back portion 310 allow for airflow through support frame 300. Non-perforated portions 304 may be disposed along back portion 310, for example in a strip-like manner, at which air is restricted from flowing through support frame 300. Because airflow is restricted at non-perforated portions 304, an installed filter will be prevented from accumulating grease such that non-perforated portions 304 may serve as a visual indicator for the useable life of the installed filter. For example, the portions of the installed filter corresponding to non-perforated portions 304 may serve as a reference point to compare the rest of the filter to and determine the level of use of the filter. One or more retaining members 305, such as clips, clamps, or the like, may be disposed on or near the front face of top bracket portion 303. Retaining member 305 may be used to secure a frameless filter pad and wire cover to back portion 310, as described in more detail below.

Figure 30:
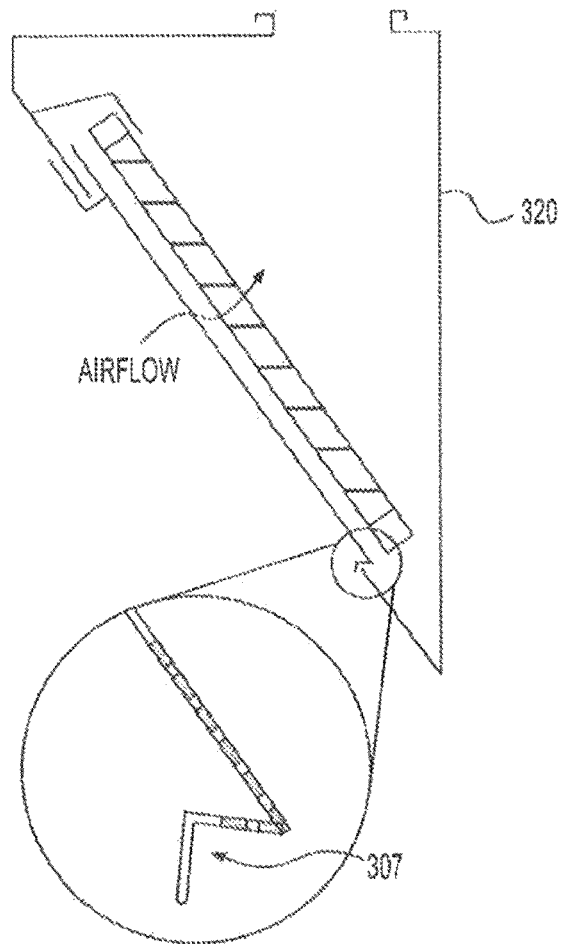
FIG. 30 is a side view of a support frame in an exhaust hood, according to an embodiment of the invention.

FIG. 30 depicts a side view of a support frame in an exhaust hood 320. Air flows into the exhaust hood, passing through support frame 300 and installed filters. As depicted in FIG. 30, an alternative bottom clip portion 307 may be provided to connect with a bottom edge of exhaust hood 320 while providing support for an installed filter. Bottom clip portion 307 may be substantially L-shaped extending from the bottom of back portion 310 of support frame 300.

Figure 31:
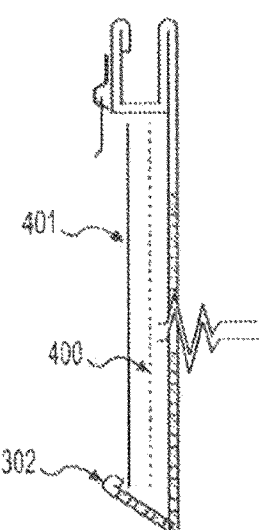
FIG. 31 is a side view of a support frame with a metal wire frame and retaining member, according to an embodiment of the invention.

FIG. 31 depicts a side view of a support frame 300 with a wire frame 401 and retaining member 305. A frameless filter pad 400 may be secured between support frame 300 and wire frame 401. Wire frame 401 may be comprised of metal and/or any alternative suitable material. Retaining member 305 may secure wire frame 401 with support frame 300 such that the bottom of wire frame 401 is disposed within bottom edge 301 of support frame 300.

Figure 32:
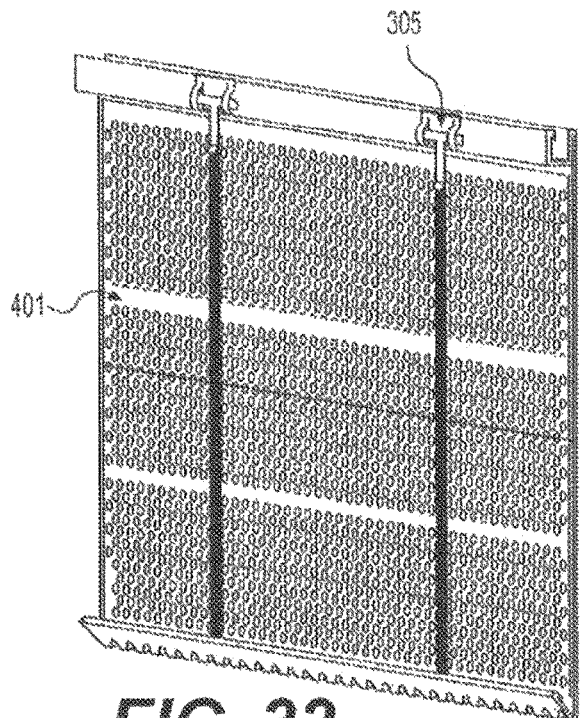
FIG. 32 is a perspective view of a support frame with a wire frame and retaining member, according to an embodiment of the invention.
Figure 33:
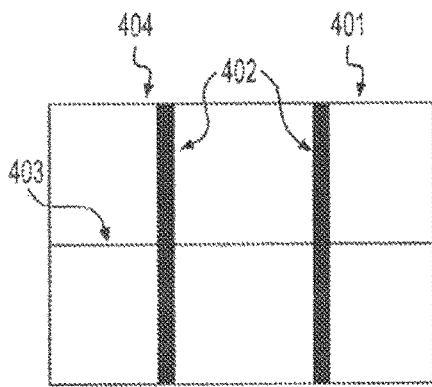
FIG. 33 is a front view of a support for a filter, according to an embodiment of the invention.

FIG. 32 depicts a perspective view of a support frame 300 with wire frame 401 and retaining member 305. As depicted in FIG. 33, wire frame 401 may include a perimeter support 404 and a horizontal support 403. Vertical portions 402 may be provided and may have a thickness that blocks or prevents grease from accumulating on corresponding portions of a filter that are disposed behind vertical portions 402. Thus, in an alternative arrangement, vertical portions 402 may provide a visual indicator for the useable life of the installed filter. For example, the portions of the installed filter corresponding to vertical portions 402 may serve as a reference point to compare the rest of the filter to and determine the level of use of the filter.

Figure 34:
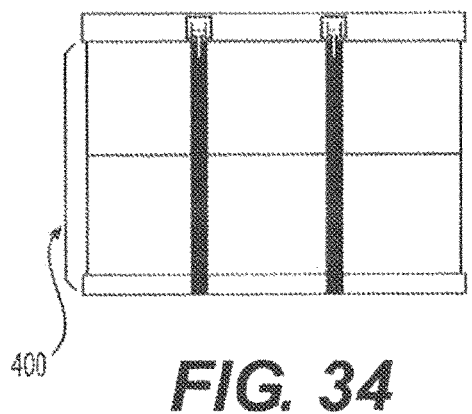
FIG. 34 is a front view of a support frame with a filter, according to an embodiment of the invention.

FIG. 34 depicts a front view of support frame 300 with a frameless fiber filter pad 400 installed therein, according to an embodiment of the invention. As depicted in FIG. 34, a portion of filter pad 400 may extend past open sides of back portion 310, such that when installed in an exhaust hood, a metal-to-metal seal may be firmed between filter pads. Further, filter pad 400 is secured in support frame 300 with wire frame 401 retained with retaining member 305.

Figure 35:
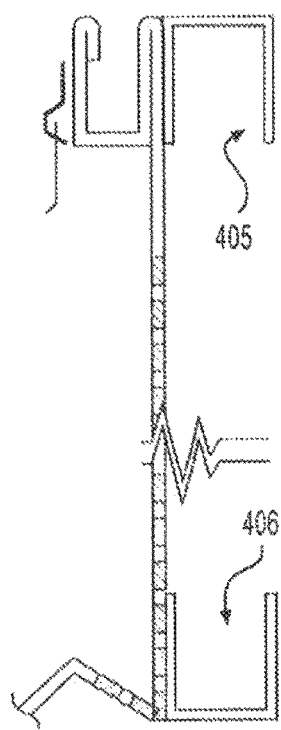
FIG. 35 is a side view of a support frame, according to an embodiment of the invention.
Figure 36:
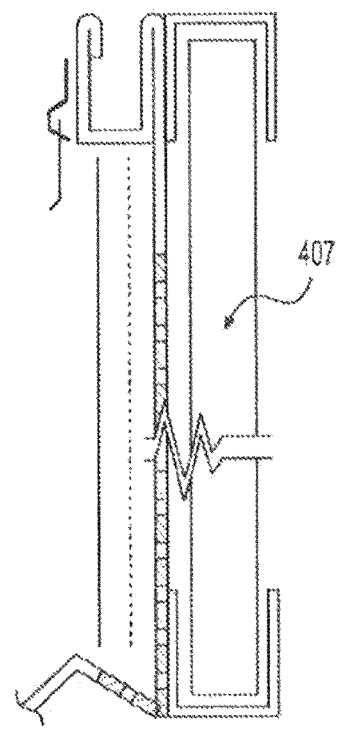
FIG. 36 is a side view of a support frame with a baffle filter, according to an embodiment of the invention.

FIG. 35 depicts a side view of a support frame 300 with additional channels provided, according to an embodiment of the invention. In an alternative arrangement, support frame 300 may include a top channel 405 provided on the back of support frame 300 and a bottom channel 406 provided on the back of support frame 300, corresponding to top channel 405. Each of top channel 405 and bottom channel 406 may be substantially U-shaped and configured to support a baffle filter, for example, a UL 1046 metal baffle filter 407, or the like, as depicted in FIG. 36

Figure 37:
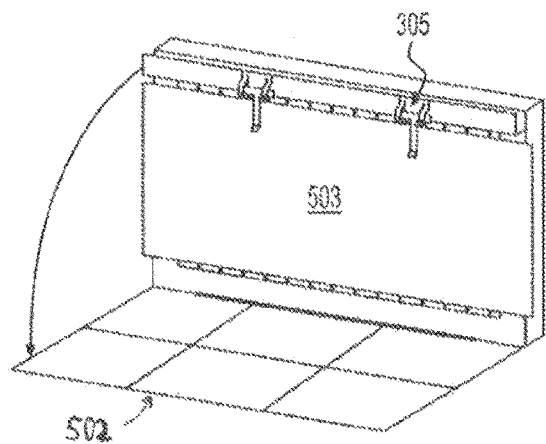
FIG. 37 is a perspective view of a support frame with a filter and wire frame, according to an embodiment of the invention.
Figure 38:
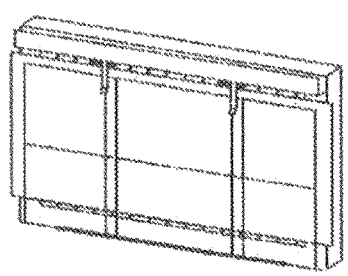
FIG. 38 is a perspective view of a support frame with a filter and wire frame secured with a retaining member, according to an embodiment of the invention.

FIGS. 37-41 depict a filter assembly having a support frame 300, a frameless filter pad 400, a baffle filter 407, and a wire frame 502 as a front cover that may pivot or be hinged. FIG. 37 depicts a perspective view of a support frame 300 with a filter pad 400 and wire frame 502, according to an embodiment of the invention. Retaining members 305 may selectively secure and allow movement of wire frame 502, which may pivot outward and downward or be hinged to move in such a manner. FIG. 38 depicts a perspective view of support frame 300 with a filter pad 400 and wire frame 502 secured with retaining members 305 and support frame 300 supporting a baffle filter 407.

Figure 39:
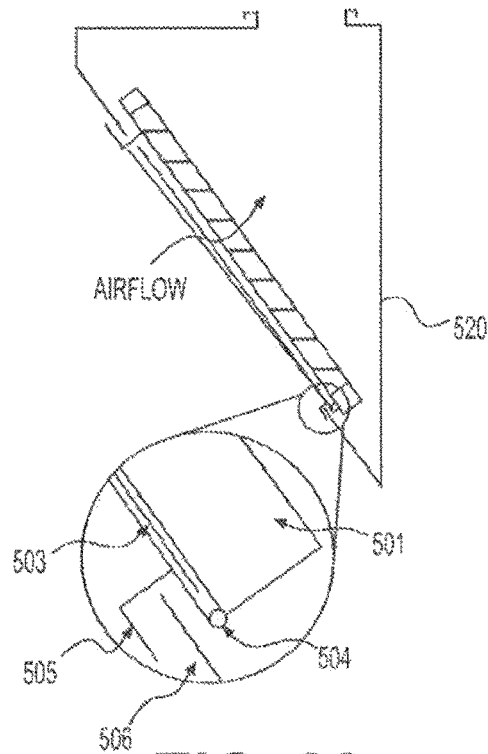
FIG. 39 is a side view of a support frame with a disposable filter and baffle fitter in an exhaust hood including an expanded view of a support frame clip, according to an embodiment of the invention.

FIG. 39 depicts a side view of a support frame 300 with a filter pad 400 and baffle filter 501 in an exhaust hood 520, including an expanded view of a support frame clip 505, according to an embodiment of the invention. Support frame clip 505 may be disposed at or near a bottom portion of support frame 300 and may be substantially L-shaped extending from support frame 300. Support frame clip 505 may be configured to be coupled with or secured to a bottom lip 506 of exhaust hood 520. A pivot point or hinge 504 may be provided at or near the bottom portion of support frame 300 to allow swinging movement of wire frame 502.

Figure 40:
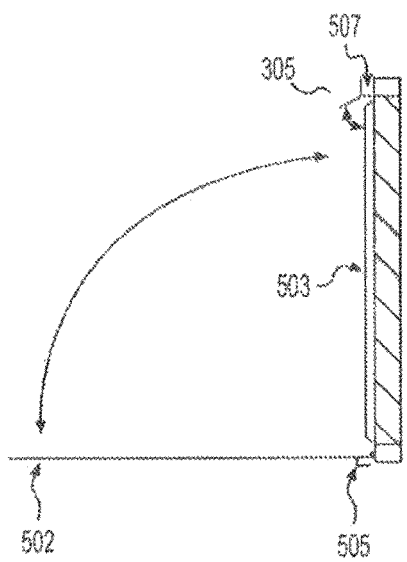
FIG. 40 is a side view of a support frame with a disposable filter and baffle filter, according to an embodiment of the invention.
Figure 41:
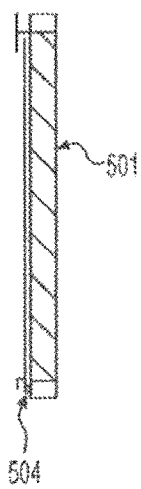
FIG. 41 is a side view of a support frame with a disposable filter secured with a retaining member and baffle filter, according to an embodiment of the invention.

FIGS. 40 and 41 depict a side view of a support frame 300 with a frameless filter pad 400 and baffle filter 501 with wire frame 502 in an open position and a closed position, respectively. Support frame 300 may include a top bracket portion 507 that may serve to couple support frame 300 to an upper lip of exhaust hood 520 while also retaining a top portion of filter pad 400 therein.

While the invention has been described in connection with several embodiments, it will be understood by those of ordinary skill in the art that other variations and modifications of the preferred embodiments described above may be made without departing from the scope of the invention. Other embodiments will be apparent to those of ordinary skill in the art from a consideration of the specification or practice of the invention disclosed herein. The specification and the described examples are considered as exemplary only, with the true scope and spirit of the invention indicated by the following claims.

What is claimed is:

1. A grease filter for installation within an aperture of an exhaust hood overlying kitchen equipment where heat or flame may occur, the grease filter comprising:
    an external frame assembly,
    a first perforated insert disposed within the external frame assembly, wherein the external frame assembly and the first perforated insert define a downstream portion of the grease filter and an upstream portion of the grease filter on opposing sides of the first perforated insert;
    a baffle filter disposed within the downstream portion of the grease filter, the baffle filter being secured within the external frame assembly;
    a second perforated insert configured to move from a first position to a second position; and;
    a filter pad disposed within the upstream portion of the grease filter adjacent the second perforated insert;
    wherein:
        the first position permits installation of the filter pad within the grease filter and the second position does not permit installation of the filter pad within the grease filter; and
        the upstream portion of the grease filter comprises the first perforated insert.

2. The grease filter of claim 1, wherein the baffle filter comprises at least first and second rows of baffles, the first and second rows of baffles in staggered relation to each other.

3. The grease filter of claim 2, wherein the baffle filter is approximately 1.905 to 3.81 cm thick.

4. The grease filter of claim 1, wherein the filter pad comprises fibers comprising one or more of:
    wool fibers;
    wood-based viscose fibers; and
    cellulose-based synthetic fibers.

5. The grease filter of claim 1, wherein the filter pad comprises at least one surface configured to be removably coupled to the second perforated insert.

6. The grease filter of claim 1, wherein the second perforated insert is coupled to the external frame assembly via a hinge mechanism.

7. The grease filter of claim 1, wherein the first perforated insert is secured to one or more divider tabs of the external frame assembly.

8. The grease filter of claim 1, wherein one or more handles are pivotally connected to the external frame assembly.

9. The grease filter of claim 2, wherein each of the first and second rows of baffles include a plurality of baffles spaced apart from each other to provide openings therebetween for the flow of air therethrough.

10. A grease filter for installation within an aperture of an exhaust hood overlying kitchen equipment where heat or flame may occur, the grease filter comprising:
    an external frame assembly defining a pathway for airflow therethrough and partially defining a upstream portion of the grease filter and a downstream portion of the grease filter;
    a baffle filter disposed within the downstream portion of the grease filter, the baffle filter being secured within the external frame assembly; and
    a first perforated insert configured to move from a first position to a second position, wherein the first position permits installation of a filter pad within the grease filter and the second position does not permit installation of the filter pad within the grease filter; and
    wherein:
        the upstream portion of the grease filter comprises the first perforated insert.

11. The grease filter of claim 10, wherein the filter pad, when installed, is disposed within the upstream portion of the grease filter adjacent to the first perforated insert.

12. The grease filter of claim 11, the first perforated insert being configured to provide support to the filter pad to maintain the filter pad in a generally flat configuration.

13. The grease filter of claim 10, wherein the baffle filter comprises at least first and second rows of baffles, the first and second rows of baffles in staggered relation to each other.

14. The grease filter of claim 13, wherein the baffle filter is approximately 1.905 to 3.81 cm thick.

15. The grease filter of claim 11, wherein the filter pad comprises fibers comprising one or more of:
   wool fibers;
   wood-based viscose fibers; and
   cellulose-based synthetic fibers.

16. The grease filter of claim 11, wherein the filter pad comprises at least one surface configured to be removably coupled to the first perforated insert.

17. The grease filter of claim 10, wherein the first perforated insert is coupled to the external frame assembly via a hinge mechanism.

18. The grease filter of claim 10, further comprising a second perforated insert disposed within the external frame assembly and secured to one or more divider tabs of the external frame assembly.

19. The grease filter of claim 10, wherein one or more handles are pivotally connected to the grease filter.

20. The grease filter of claim 13, wherein each of the first and second rows of baffles include a plurality of baffles spaced apart from each other to provide openings therebetween for the flow of air therethrough.

* * * * *